May 26, 1925.
K. STAHL
1,539,217
LONG DISTANCE TRACTION ROPE DEVICE
Filed June 28, 1920
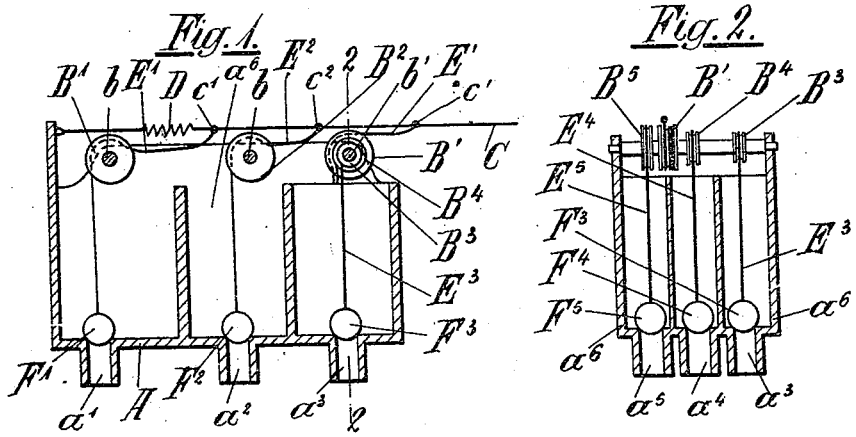
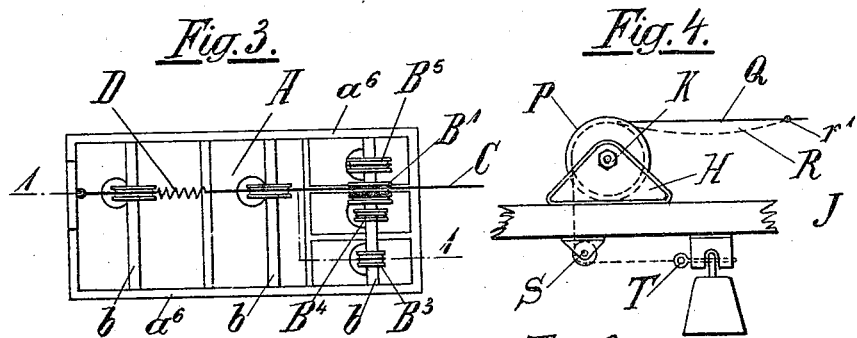
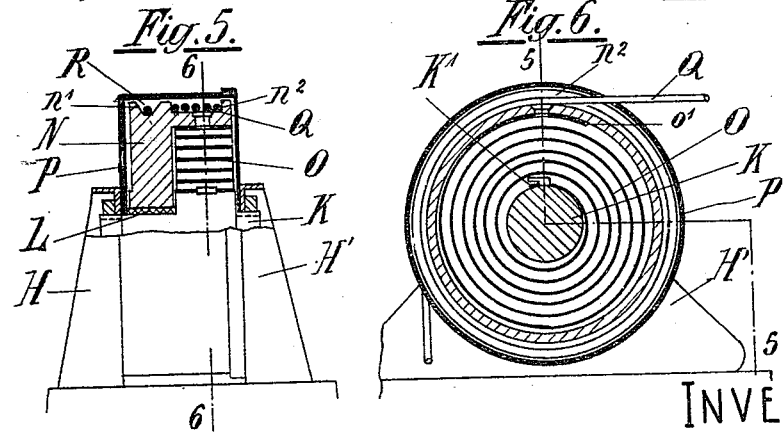
INVENTOR:

Patented May 26, 1925.

1,539,217

UNITED STATES PATENT OFFICE.

KARL STAHL, OF FRIEDRICHSHAFEN, GERMANY, ASSIGNOR TO THE FIRM: LUFT-SCHIFFBAU ZEPPELIN GESELLSCHAFT MIT BESCHRANKTER HAFTUNG, OF FRIEDRICHSHAFEN, GERMANY.

LONG-DISTANCE TRACTION-ROPE DEVICE.

Application filed June 28, 1920. Serial No. 392,604.

*To all whom it may concern:*

Be it known that I, KARL STAHL, a German citizen, residing at Friedrichshafen, a/B., Germany, have invented certain new and useful Improvements in Long-Distance Traction-Rope Devices, of which the following is a specification.

My invention refers to appliances for opening valves, dropping bombs, etc. and more especially to mechanical traction rope devices destined for operating at a distance and therefore possessing great length. The appliances of this kind known hitherto have the draw-back that the long traction element owing to its dead weight, permanently sags. To do away with the consequent insecurity in working is the object of the present invention. This object is achieved by a special subdivision of the traction rope device according to which the real traction rope is under a practically even tension although the length be varying and does not sag, and still does not, through being shortened, call forth an undersired operation of the valve, or the bomb-dropping device for instance.

Accordingly the object of my invention consists in a traction rope device for opening valves, dropping bombs, etc. in which a main traction element preferably consisting of wire, possesses a bifurcation just before the valve, or the bomb cage, etc. to be operated. According to the invention the one branch leads to a fixed point and is permanently kept taut by inserting a spring as a part of the main traction rope. The branch leading to the valve or to the bomb-cage on the other hand possesses such a length that it is only tautened after the main line starting from the "off" position, has overcome a certain fraction of the opening way provided for it.

The invention offers special advantages, if several dropping devices, valves, etc. are to be operated shortly following in one another or simultaneously. For then only the main traction rope receives a spring-loaded elongation serving to keep it permanently taut. To this main the branches are connected in any desired number and with such individual length or intervals, respectively, that, according to their adjustment, the individual lines come under tension either simultaneously or at various intervals after overcoming one or several fractions of the opening way provided for the main line.

An arrangement, which is particularly suitable for valves adjoining each other, is obtained by leading the various individual branches over stretching pulleys of varying diameters, if so be necessary, which are arranged on a common axis and are rotatable independently of one another.

For the permanent tautening of the main traction line one or several springs, the choice of which in itself is optional, can be employed. But ordinary tension springs easily have a tendency towards oscillating, more especially, if large ways of displacement are necessary and the accommodation takes place in an air-craft permanently exposed, to rocking. In further detailing the invention the main traction line and the branch line are therefore each taken over a part of a common stretching pulley which is influenced by a spiral spring enclosed in it as in a kind of casing. By this means an exceedingly small demand for space is combined with the greatest safety in working.

The drawing attached to this specification and forming part thereof, illustrates two modifications embodying my invention by way of example in a purely diagrammatical manner.

Fig. 1 is a view and partly a cross section of a traction rope device which is attached to a tank with five valves designed on the line 1—1 of Fig. 3.

Fig. 2 is the pertinent section in 2—2 of Fig. 1 and

Fig. 3 is the corresponding view from the top.

Fig. 4 is a view of a traction rope device in connection with a bomb dropping arrangement, whilst Figs. 5 and 6 show, on an enlarged scale, a detail belonging to Fig. 4, Fig. 5 being a partial section on the line 5—5 of Fig. 6 and Fig. 6 a section on the line 6—6 of Fig. 5.

Referring to Figs. 1 to 3 a tank A which is open at the top, is subdivided by partitions into two larger chambers following on each other, and three smaller ones next to each other. Each of the five chambers filled, for instance, with water ballast, has a discharging opening $a^1$, $a^2$, $a^3$, $a^4$, $a^5$ in its floor. The outer long sides $a^6$ of the tank serve as bearings for the axles $b$ and $b'$ of pulleys $B'$—$B^5$ and $B'$. A wire cable C is connected to the frontal surface of the casing A by means of a tension spring D and leads to the operator's stand. It is arranged in the same vertical plane as the pulleys $B^1$, $B^2$ and $B^3$. One branch each $E^1$ and $E^2$ leads from the branching point $c^1$ and $c^2$ over the pulleys $B^1$ and $B^2$ to the valve balls $F^1$ and $F^2$. A third branch $E^3$ connects a branching point $c^3$ with the pulley $B^3$ to which it is fastened after being wound around it several times. The pulleys $B^3$, $B^4$, $B^5$ fixed rigidly to the axle $b'$ like the pulley $B^3$, each bear a traction rope branch $E^3$, $E^4$, $E^5$ which ends in a valve ball $F^3$, $F^4$, $F^5$.

As can be observed from Fig. 1 the sag of the branches $E^1$, $E^2$, $E^3$ varies. Also the pulleys $B^3$, $B^4$, $B^5$ differ in size. The operation of the valve $F^1$, of the valve $F^2$ and of the valves $F^3$—$F^5$ therefore takes place by steps with regard to one another, the valves $F^3$—$F^5$ being pulled simultaneously.

As the pulleys $B^3$—$B^5$ have different sizes the valve balls are lifted to varying extents with one or the same displacement of the traction cable C or the branch rope $E^1$. This varying valve lift becomes necessary, if the various tanks contain liquids of differing specific weight, such as for instance water, oil and petrol and if importance is attached to the fact that the compartments originally filled evenly, are emptied of an equal proportion of the original contents in the same time. This latter demand must occasionally be complied with, if the various tanks to be operated from the same stretching pulley axle $b'$ are arranged at various distances from the plane of symmetry of an air-craft, for instance, and if the equilibrium originally existing in regard to this plane of symmetry, is to be maintained in the course of emptying.

In Figs. 4—6 two bearing plates H and H' fixed to a part J of the frame-work, carry an axle K and a tubular distance piece L enclosing it. The letter guides a casing-shaped pulley N which on its periphery possesses one comparatively narrow and one broader groove $n^1$—$n^2$ respectively. The hollow of the pulley N contains a spiral spring O the one end of which is fastened to the rim of the pulley N at $o^1$, whilst the other end is attached to the rigid axle K at $k^1$. A cylindrical bearing casing P encloses the pulley N on all sides. A main traction cable Q is laid round several times in the groove $n^2$ and finally fastened to the pulley N. Its loose end is taken through an opening provided in the casing P, and passes into the long-distance line. A branch R is connected to the main traction cable at $E^1$ outside the casing. The branch R is led over the narrower groove $n^1$ of the pulley N and over a guiding pulley S to a trigger T of a bomb dropping device.

The dimensions are chosen in such a manner that, in the "off" position shown in Fig. 4, main traction cable Q is taut, it is true, owing to the effect of the spring O, but that the branch R is led with a certain amount of sag from the branching points $r^1$ to the trigger T as indicated in Fig. 4 by the sag in the upper part of the branch. If the main traction rope Q is pulled, the pulley N turns only causing a slipping at first with regard to the branch which only lies on it loosely. As soon as the branch rope R is completely tautened through the growing displacement of the main traction rope Q, the slipping between the branch and the pulley N ceases, whilst simultaneously with a further increase in displacement of the main traction rope Q the trigger T is pulled from its bearing.

I claim:

1. In a device of the kind described in combination, a main traction member secured at both ends, means for keeping said member taut, and slack branch traction members of different length, each connected at one end with said main member and at the other with an object to be operated by a tractive effort.

2. In a device of the kind described in combination, a shaft, a sheave on said shaft, a main traction member and a branch traction member extending side by side around different portions of the circumference of said sheave and means for keeping said main traction member taut, while said branch traction member is slack.

3. In a device of the kind described in combination, a shaft, a sheave on said shaft, a spiral spring in a hollow of said sheave having one end fixed to said sheave and the other to said shaft, a main traction member having one end wound around said sheave and the other secured to a fixed point so as to be kept taut by the action of said spring, and a slack branch traction member extending from said main member over said sheave besides said main member to an object to be operated by a traction effort.

In testimony whereof I affix my signature.

KARL STAHL.